(12) United States Patent
Gauthier et al.

(10) Patent No.: US 8,181,602 B2
(45) Date of Patent: May 22, 2012

(54) COMPRESSED STRAW MATERIAL

(75) Inventors: Danielle Gauthier, La Broqueire (CA);
Maria Gala, Winnipeg (CA); Eugene Gala, Winnipeg (CA); Stephane Gauthier, La Broqueire (CA)

(73) Assignee: Prairie Bio-Energy Inc., Winnipeg, Manitoba (CA)

( * ) Notice: Subject to any disclaimer, the term of this patent is extended or adjusted under 35 U.S.C. 154(b) by 329 days.

(21) Appl. No.: 12/580,562

(22) Filed: Oct. 16, 2009

(65) Prior Publication Data
US 2010/0192867 A1  Aug. 5, 2010

(51) Int. Cl.
*A01K 1/015* (2006.01)
(52) U.S. Cl. ........................ 119/172; 119/28.5
(58) Field of Classification Search .................. 119/172, 119/171, 28.5, 174
See application file for complete search history.

(56) References Cited

U.S. PATENT DOCUMENTS

| | | | |
|---|---|---|---|
| 3,408,923 A * | 11/1968 | Bushmeyer | 100/35 |
| 4,038,944 A * | 8/1977 | Tucci | 119/458 |
| 4,122,767 A * | 10/1978 | Jarrett et al. | 100/35 |
| 4,436,502 A * | 3/1984 | Nelson et al. | 425/331 |
| 5,209,186 A * | 5/1993 | Dewing | 119/172 |
| 5,429,073 A * | 7/1995 | Ballard | 119/171 |
| 6,021,598 A * | 2/2000 | Holton | 47/9 |
| 2002/0068118 A1* | 6/2002 | Gombos et al. | 426/132 |
| 2011/0088631 A1* | 4/2011 | Hsieh et al. | 119/172 |
| 2011/0210469 A1* | 9/2011 | Keller | 264/140 |

FOREIGN PATENT DOCUMENTS

GB    2252709    8/1992

* cited by examiner

*Primary Examiner* — Yvonne Abbott
(74) *Attorney, Agent, or Firm* — Adrian D. Battison; Ade & Company Inc.

(57) ABSTRACT

Bedding material for livestock is produced by extruding straw through a conventional cubing system rather than a conventional pellet mill. The cubing process generates friction in turn changing the properties of the straw making the straw particles highly absorbent. The cubing process allows for greater particle size in the finished product as compared to pellets produce in a conventional pellet mill. The process involves the following: shredding the straw to proper size, cubing the straw into cubes and flakes, cooling, storing and packaging. The cubing process requires 40% less energy based on throughput of finished product, thus making the material more affordable to larger farming operations. Some other properties include a higher bulk density than large conventional bales or wood shavings, less dust when applying, a pasteurized product, easier to handle and spread compared to straw bales, wood shavings and sawdust.

29 Claims, 4 Drawing Sheets

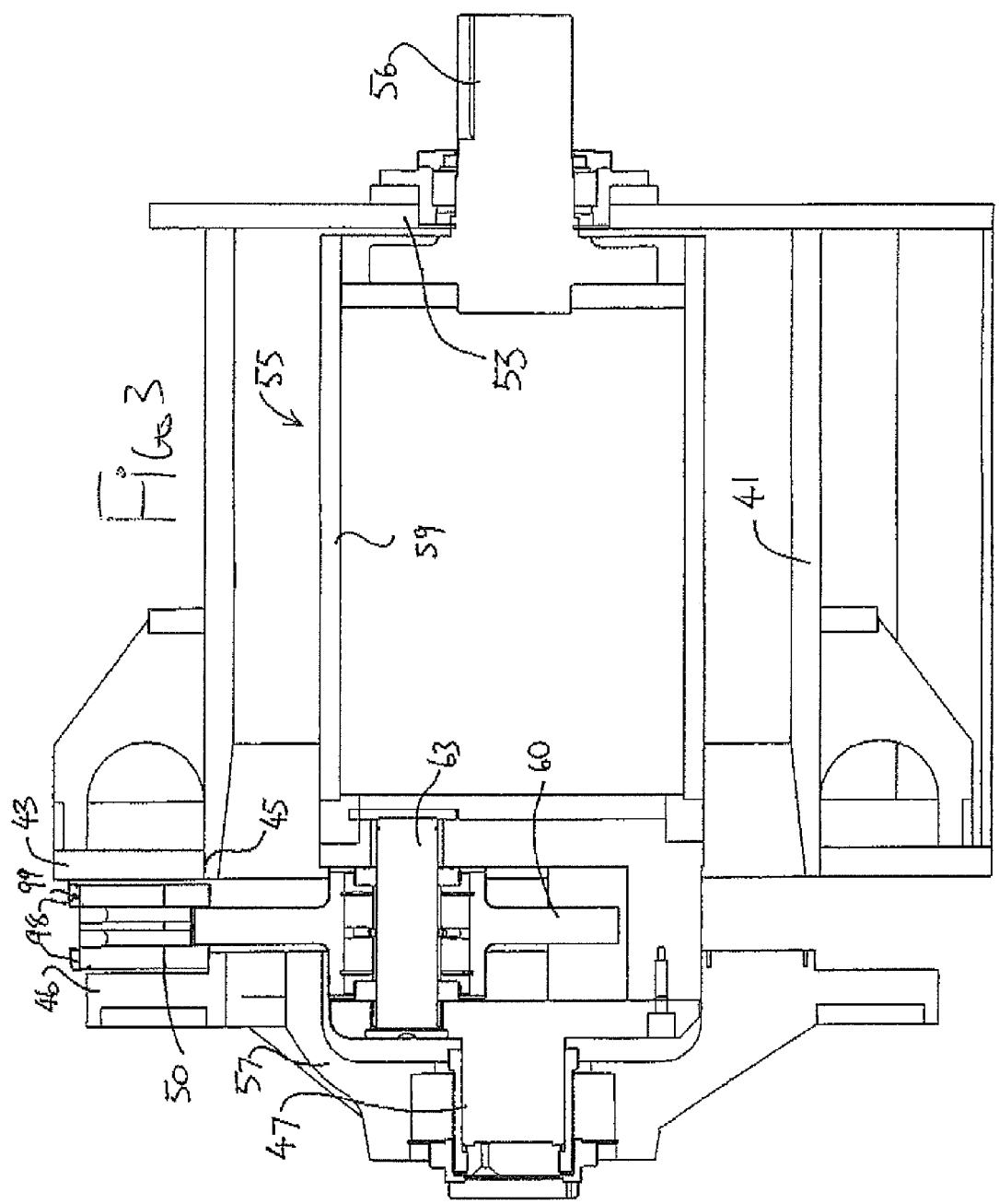

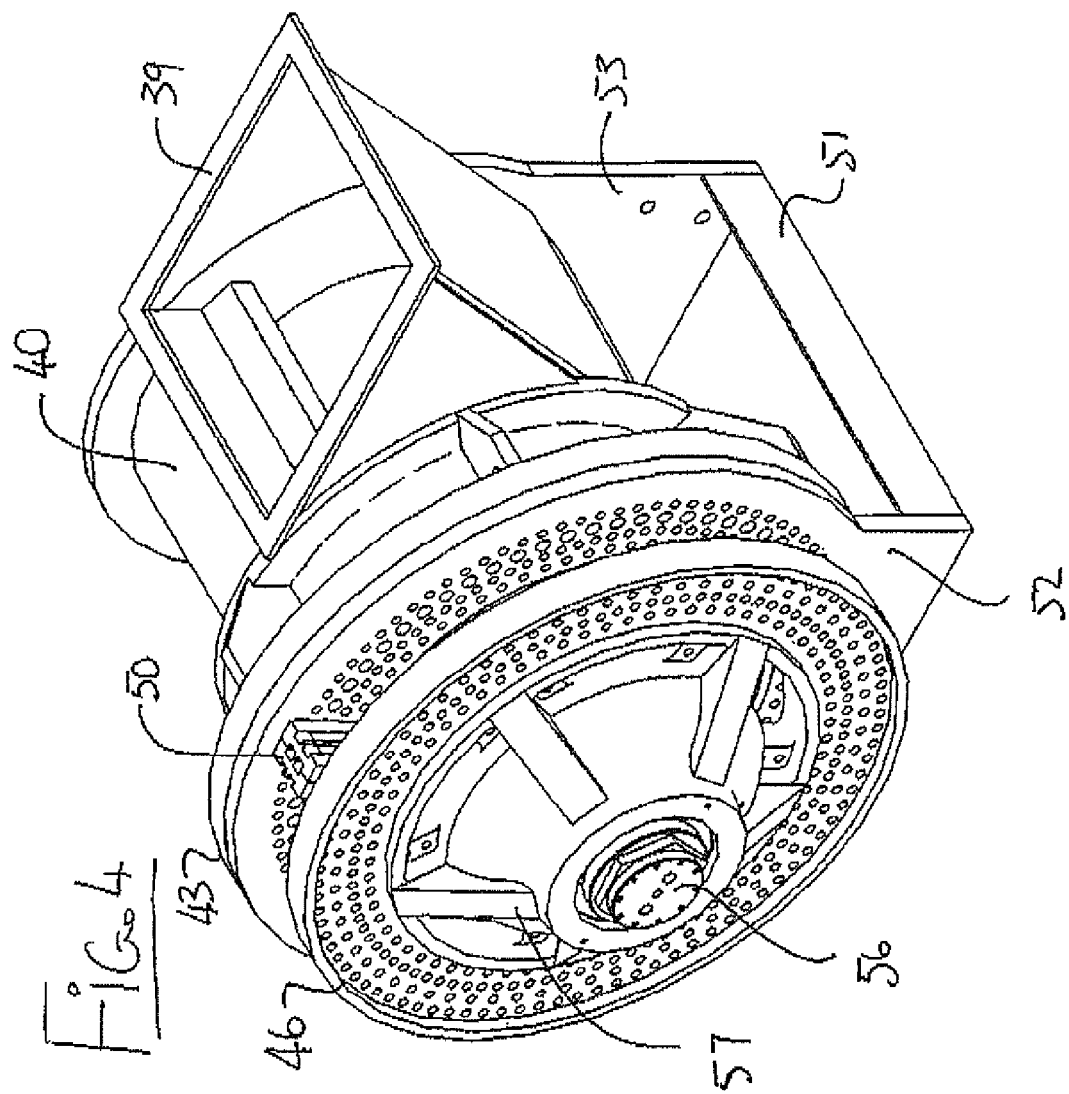

COMPRESSED STRAW MATERIAL

The invention is related generally to a compressed straw material which is particularly but not exclusively used for bedding material for livestock.

BACKGROUND OF THE INVENTION

For years the livestock industry has been faced with challenges in regards to bedding materials for animals. Recently wood shavings and other wood by-products have been more difficult to find as more wood pellet plants are being constructed throughout North America to produce wood pellets for heat energy. In the last few years the price has increased and availability has decreased on bagged shavings.

It is known for example from British Application 2,252,709 (Bates) assigned to Unilever and published 19 Aug. 1992 that straw can be formed into pellets and crumbled to make a suitable flooring or bedding material for poultry, pigs and similar animals where the bedding becomes contaminated with excreta, feathers, moisture, food particles and the like and is designed to act a an absorbent for the materials. However this arrangement has apparently achieved little success and is not popular in North America.

SUMMARY OF THE INVENTION

According to the first aspect of the invention, there is provided a bedding material for livestock comprising:

an extruded body of a compressed mass of crop material, the body having a constant cross sectional shape along its length;

the body being broken transversely at spaced positions along its length into pieces at least some of which form flakes;

the crop material comprising one or more of wheat straw, barley straw, oat straw, timothy straw and various forage straws;

the body being compressed and heated using a densification system.

According to a second aspect of the invention there is provided a method of providing bedding for animals comprising;

providing a bedding material according to claim 1;

wherein the bedding material comprises an extruded body of a compressed mass of crop material, the body having a constant cross sectional shape along its length;

wherein the body is broken transversely at spaced positions along its length into pieces at least some of which form flakes;

wherein the crop material comprises one or more of wheat straw, barley straw, oat straw, timothy straw and various forage straws;

wherein the body is compressed and heated using a cubing system.

Preferably at least some of the flakes have a transverse dimension matching that of the body.

Preferably the straw is shredded to less than 6 inch length.

Preferably the straw is cubed using a substantially square die to form an extruded body of square cross-section and square flakes. However the die could be also round or any other shape.

Preferably the straw cubes and or flakes are cooled.

Preferably the straw is shredded so as to contain at least some pieces which are greater than 1.0 inch length Preferably the cubing process exerts extreme pressure and friction on the straw particles causing the internal cell walls of the straw to collapse and expel any moisture locked within. This refining action is due to the nature of the cuber. The press wheel exerts a slip action that causes the hemi-cellulose to break down maintaining a long straw fibre. Pellets produced using a conventional pellet mill will not have this characteristic.

Preferably the cubed straw becomes 10-40% more absorbent than dry wood shaving or sawdust (6% Moisture Content).

Preferably the cubed straw is exposed to temperature above 110° F. for a minimum of 3 seconds so as to become pasteurized.

Preferably the shredded straw is compacted with a minimal force of 1000 PSIG.

Preferably the final product moisture content is below 15%.

Preferably any seed in the straw is made sterile by the heat generated in the compression during which the process destroys the germ of any seed.

Preferably the straw cubes and/or flakes have a bulk density of 12-35 lbs/cu ft.

Preferably dust particles in the shredded straw are compacted together during the compaction thus minimizing dust in the flakes.

Preferably the shredded product has moisture content of 30% or lower.

Preferably material is extruded through an orifice having a transverse dimension in the range from 0.25 to 2.25 inches.

Preferably the straw cubes are broken up into smaller pieces, flakes and fines by allowing the cubes to free fall and hit a deflection plate.

Preferably the particle length of the final product is equal or below the longest cross section dimension of the die.

Preferably the straw is blended with shredded paper or cardboard.

Preferably the straw is blended with wood shavings or sawdust for added fragrance.

Preferably salt or calcium compounds are added to the mixture to aid in de-icing in cold climates and make handling easier Preferably the cubes and/or flakes are easily broken down by the absorption of liquids and animal movement on the product.

Preferably the product after use is arranged to be composted into very high quality compost.

Preferably the cubes create thin flakes that allow the product to have more coverage.

Preferably the flakes are less than 0.5 inch in thickness.

Preferably the compressed straw in the cubes and flakes is soft and has a "fluffy" texture making the bedding comfortable for the animals.

Preferably the flakes once broken apart by the animal have the appearance of freshly shredded straw.

Preferably the flakes have an appealing appearance of golden colored strands of straw giving the material a clean and uniform bedding.

Preferably the flaked bedding provides a very good insulation factor to aid in keeping the animals warm during transport and in stalls.

Preferably the cubed bedding is easily spread in livestock transport trailers and barn stalls.

Preferably the flakes lay flat on a surface that is applied on create a matting effect compared to pellets or crumble that can roll around and cause a slippery surfaces and cause injury to animals.

This invention is intended to offer an alternative to bagged shavings being offered in the market. Some of the markets being targeted are the livestock transportation, poultry farms and equine farms that typically use abundant amounts of wood shavings for bedding as well as small animals bedding and cat litter.

The intent is to be able to provide a product that can be bagged, has a relatively high bulk density, and that can perform as well if not better than wood shavings. Through having conducted extensive research and trials, the straw flakes have proven to be a more than suitable alternative. The product can be packaged in various size and types of bags to accommodate many markets including small pet markets to large scale farms that could take bulk deliveries.

In the central plains of Canada, many new laws are being implemented to restrict stubble burning of straw in fields after harvest. This has created abundance straw residues that become a nuisance to the farmer. This invention would help create a new market opportunity for farmers wishing to bale the straw and create a value added product.

The arrangement described herein provides a method of producing highly absorbent animal bedding from wheat straw. The invention is an alternative to expensive wood shavings and sawdust used for animal bedding. This product is produced by extruding straw through a conventional cubing system that generates heat in turn changing the properties of the straw making the straw particles highly absorbent. The process involves the following: shredding the straw to proper size, cubing the straw into cubes and flakes, cooling and storage. Some other properties include a higher bulk density than bales or wood shavings, less dust when applying, a pasteurized product, easier to handle and spread compared to other conventional beddings. This product is produced by extruding straw through a conventional cubing system rather than a conventional pellet mill. The cubing process allows for greater particle size in the finished product as compared to pellets produce in a conventional pellet mill. The process involves the following: shredding the straw to proper size, cubing the straw into cubes and flakes, cooling, storing and packaging. The cubing process requires 40% less energy based on throughput of finished product, thus making the material more affordable to larger farming operations.

The arrangement as described herein may provide one or more of the following advantages, particularly in relation to the prior art pelleting process:

The flaked straw make for a good footing for the animals.

The flakes have a distinct ammonia capturing effect and help with odor control.

The nature of the cuber will create a refined straw particle that enhances the liquid absorption factors.

Addition of hydrated lime to stabilize the product and inhibit against molds. The lime will also aid in decreasing the moisture in the product.

Product can be used for cat litter and small pets by using a smaller die configuration.

Ease of washing out from trucks.

Spreads out easier than pellets. Provides more surface area.

The process generates straw flakes or wafers rather than pellets.

The processing costs are far less than conventional pellet production. It is estimated that the overall energy cost savings could be greater than 40%.

The main differences between a conventional pellet form and a wafer or flake are the following:

It is 30-40% more cost effective to produce thus putting the flakes in the same value range as wood shavings. The pelleting process tends to make the pellet more expensive.

When saturated the pellets will tend to swell up, fall apart and create a sloppy paste that is difficult to muck up. On the other hand the flakes will swell and absorb liquid while still remaining in a coarsely chop straw form making mucking up and clean up easier.

The dust from the fines or broken up pellets is evident after extensive handling or if the product has too low of a moisture content. The flakes will tend to fall apart but remain in larger particles thus minimizing airborne dust even after excessive handling.

Products in pellet forms will tend to be more round or cylindrical in nature and could potentially be somewhat harder from the processing. This can cause problems with certain animal with traction or footing making the animals slip and cause injuries. The flakes are as such that the straw particles after refining are pressed flat and create a matting effect or flake formation. When spread on the floor it will actually enhance traction and prevent animal injuries.

The particle size to produce pellets will typically be under 10 mm (0.4 inches) where as the flake particle size will be as long as 63.5 mm (2.5 inches)

The colors of the pellets are typically darker due to the nature of the pelleting process. The surface area that is exposed to high friction is greater than on the flakes thus given the pellets a darker complexion a making the product not as esthetically appealing. The flakes once spread out and broken apart are a nice golden color and mimics freshly shredded straw.

The amount of product necessary to cover a same area will be reduced greatly by using flakes as the bulk density is slightly lower and the flakes will offer greater coverage per square foot. This translates into fewer bags to cover a stall generating costs saving when using this product.

According to a further aspect of the invention, there is provided a product comprising:

an extruded body of a compressed mass of crop material, the body having a constant cross sectional shape along its length;

the body being broken transversely at spaced positions along its length into pieces at least some of which form flakes;

the crop material comprising one or more of wheat straw, barley straw, oat straw, timothy straw and various forage straws;

the body being compressed and heated using a densification system.

The product can also be used in other applications such as liquid absorbents for industrial applications and for hydraulic mulch and hydro-seeding applications. The straw flakes can be diluted in water and easily blended into mulches that can be sprayed onto landscapes. This product can also be used for garden mulch applications.

In regard to Commercial or Industrial Absorbents, the flaked product can be used to absorb various chemicals including alcohols and hydrocarbons as a replacement of clay based absorbent. The flakes have a natural tendency to wick oils and lock them into the internal wall structures of the straw particles. This minimizes the leaching effect when land filled. The flakes offer a lighter, less dusty and easier spreading alternative to clay based materials.

In regard to Hydro Mulch, the flaked product can be used as a replacement for wood and paper fibre mulches. These mulches are used as soil amendments and erosion control products. Hydro-seeding (or hydraulic mulch seeding, hydro-mulching) is a planting process which utilizes a slurry of seed and mulch. The slurry is transported in a tank, either truck or trailer-mounted and sprayed over prepared ground in a uniform layer. Helicopters may be used in cases where larger areas must be covered. Aircraft application may also be used on burned wilderness areas after a fire, and in such uses may contain only soil stabilizer to avoid introducing non-native plant species. Hydro-seeding is an alternative to the traditional process of broadcasting or sowing dry seed. It promotes quick germination and inhibits soil erosion. The mulch in the hydro-seed mixture helps maintain the moisture level of the seed and seedlings. The slurry often has other ingredients including fertilizer, tackifying agents, green dye and other additives.

BRIEF DESCRIPTION OF THE DRAWINGS

One embodiment of the invention will now be described in conjunction with the accompanying drawings in which:

FIG. 3 is a vertical cross sectional view of the cuber of FIG. 2.

FIG. 4 is an isometric view of the cuber of FIG. 2.

DETAILED DESCRIPTION OF THE EMBODIMENTS AS SHOWN

Figure 1:
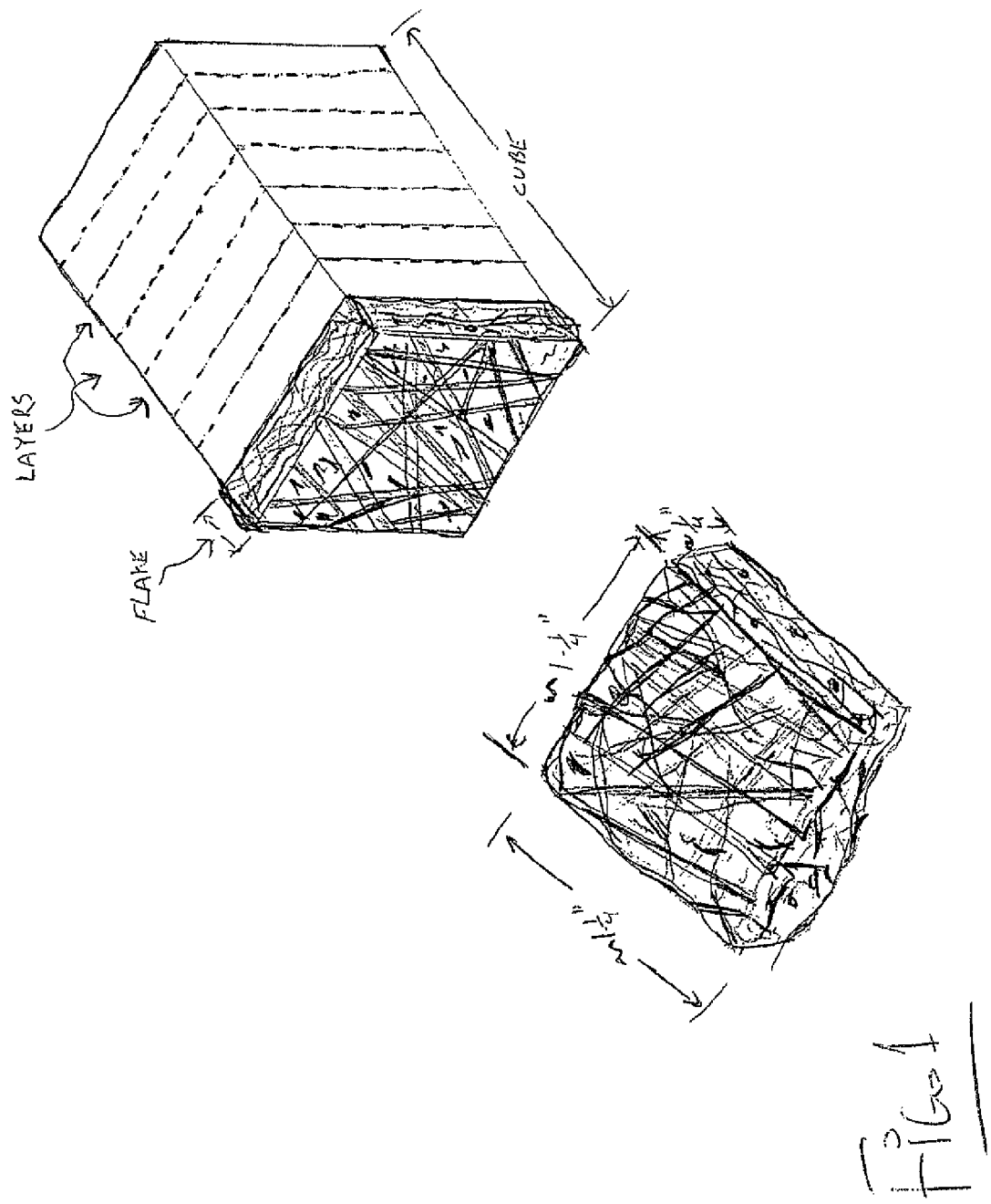
FIG. 1 is an isometric view of a cubed bedding material according to the present invention.

The technique for compression of materials to form a compressed or densified product known as "cubing" is well established and widely used. The design of the Cuber has been available for 40 years and has changed little in that time. Such a Cuber is available from Cooper Cubing Systems of Burley, Id. USA. The Cuber of this type is robust and relatively inexpensive. Such Cubers have however been used for the compression of forage crops such as alfalfa. The alfalfa is introduced into the cubing system and the high compression up to 6,000 psi of the material as it enters the series of dies creates an effective product which is extruded through the dies. The Cuber is particularly designed and arranged to provide and effective cubing action of the alfalfa to maintain an attractive green appearance of the product so that it is attractive to the animals to be fed and to the handlers of those animals.

An example of a Cuber of this type is shown in a brochure of the above company and such Cubers include an exterior housing with a longitudinal axis where the housing is held stationary with the axis horizontal. A feed duct is provided at the top of the housing for feeding the material to be cubed into the interior of the housing. The housing defines a cylindrical inner surface at the feed section where a web of the material to be compressed enters through the feed opening.

At one end of the cylindrical feed section is provided a pair of clamping disks with the disks lying in parallel radial planes of the axis. One of the disks at the feed section has a central opening through which the material feeds to be located between the two disks.

The disks act to clamp an array of radially extending, axially located dies with the array surrounding the axis and located between the clamping disks. The clamping disks clamp the dies between them using bolts passing through holes in the dies to squeeze the disks together and hold the dies at a fixed position surround the axis. The dies thus define a radially inwardly facing inlet mouth with a duct of the die extending radially outwardly toward an outlet. Each die therefore forms an extrusion tube with the material being compressed into the inner end of the die.

Within the outer housing is provided an inner rotor with a generally cylindrical outer surface at the inner surface of the feed housing of the outer housing. The inner rotor also caries a press wheel lying in the radial plane of the dies so that the press wheel rolls in the radial plane on the dies at the inlet mouth with the press wheel being mounted such so that as an axis of rotation of the press wheel rotates around the axis of the outer housing. Thus as the press wheel rotates it squeezes the material outwardly into the mouth of the die to be compressed and extruded through the die. The outer housing carries on its inner surface a plurality of upstanding flights extending from the outer surface inwardly toward the axis. The outer surface of the inner rotor also carries one or more flights which rotate with the rotor so as to sweep the material from the feed opening to the inlet of the dies where the material is engaged by the press wheel.

Outside the mouth of the dies where the material exits there is provided an angled plate so that the material as it exits engages the plate and is diverted to one side of its normal direction of movement thus causing breakage of the extruded solid stream of the material into individual pieces giving the name "Cuber", even though the length of the broken pieces may vary and differ from the transverse dimension so that the product produced is not literally a "cube".

As shown in FIG. 1, the bedding material for livestock is formed by extrusion in the cubing machine of an extruded body of a compressed mass of crop material comprising one or more of wheat straw, barley straw, oat straw timothy straw and various forage straws, the body having a constant cross sectional shape along its length. The body is naturally broken transversely at spaced positions along its length into pieces at least some of which have a length less than 0.5 inches and typically of the order of ⅛ inch to ¼ inch to form flakes. Some retain a longer length of greater than 0.5 inches to form cubes. Thus at least some of the flakes as shown in FIG. 1 have a transverse dimension matching that of the body.

The straw is shredded prior to cubing to less than 6 inch length and so as to contain at least some pieces which are greater than 1.0 inch length.

Figure 2:
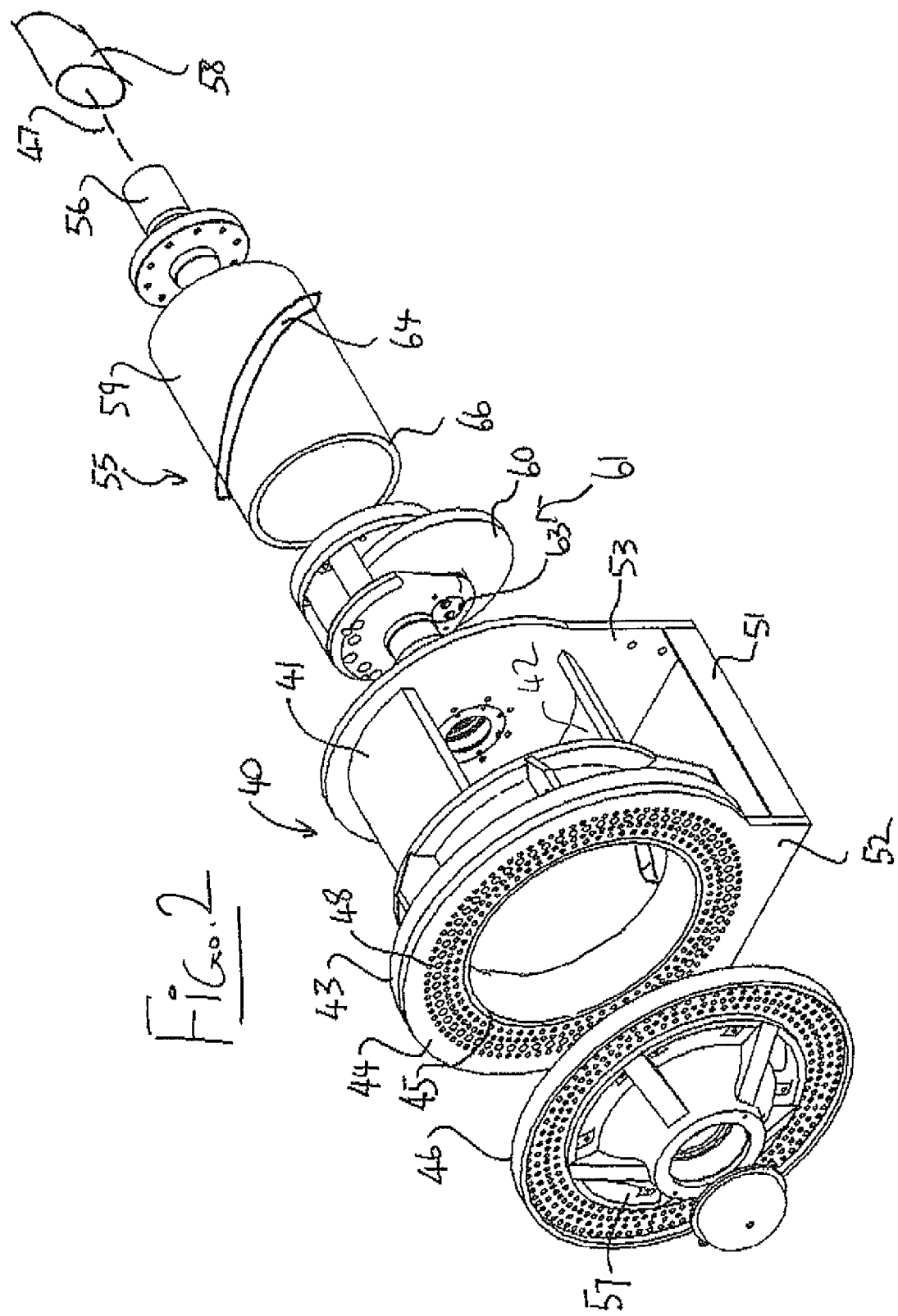
FIG. 2 is an exploded view of a cuber for manufacturing the product of FIG. 1.

As shown in the apparatus of FIGS. 2, 3 and 4, the straw is cubed using a square die to form square cubes and flakes which are naturally broken to length after cooling.

The cubing process exerts extreme pressure and friction on the straw particles causing the internal cell walls of the straw to collapse and expel any moisture locked within. The rough surface of the press wheel and the action applied on the straw causes the straw pieces to split length wise in effect refining the straw while compressing the material through the die. The cubed straw becomes 10-40% more absorbent than dry wood shaving or sawdust (6% Moisture Content). The cubed straw is exposed to temperature above 110° F. for a minimum of 3 seconds so as to become pasteurized. The shredded straw is compacted with a minimal force of 1000 PSIG. The final product moisture content is below 15%. Any seed in the straw is made sterile by the heat generated in the compression during which the process destroys the germ of any seed. The straw cubes have a bulk density of 12-35 lbs/cu ft. Dust particles in the shredded straw are compacted together during the compaction thus minimizing dust in the cubes.

The material is extruded through an orifice having a transverse dimension in the range from 0.25 to 2.25 inches and the straw cubes are broken up into smaller pieces, flakes and fines by allowing the cubes to free fall and hit a deflection plate.

The straw may be blended with wood shavings or sawdust for added fragrance.

The plant materials are selected such that they are shredded to a length of the pieces when extended which is greater than 1 inch. Thus the pieces when compressed may crumple into small elements or maybe laid into the structure as pieces as indicated at 20 where the pieces are laid through the structure and provide continuous connection through the structure.

This selection of a shredding action which provides materials having a length greater that 1 inch and commonly greater than 2 inch or 4 inch reduces the amount of dust or fines within the structure so that the pieces when they break during the forming action or at any later time do not crumble to dust but instead break along fault lines generated by the elongate pieces such as the piece 20 first to break into larger chunks rather than mere dust or fines.

The shredding action as described above is carried out so that the amount of small components or comminuted components within the structures is maintained relatively low. Thus the proportion of components having a dimension of less than 0.5 inch is less than 40%.

One of the cubing machines is shown is FIGS. 2, 3 and 4. This comprises an outer housing 40 in the form of a cylindrical drum 41 with an inlet duct 39 supplying the feed material from the conveyor into the interior of the drum. The drum has a cylindrical inside surface 42. At the end of the drum is provided a first clamping disk 43 which is welded to the end of the tube forming the drum and extends outwardly there from to form an annular disk shape as indicated at 44. The disk has a circular interior 45 matching the end of the drum 41. Thus material passing along the inside surface of the drum can pass through the hole 45 in the disk and enter the area on the outside face of the disk 43 and adjacent to the second end disk 46. The disks lay in common radial planes of an axis 47 of the drum. The disks are generally coextensive. The disks act as clamping disks and have a series of mounting holes 48 in co-operating patterns for receiving axially extending bolts between the disks. The disks thus can be used to clamp a series of dies 50 so that the dies are arranged angularly around the axis 47 with each die providing a duct through which the material from the interior of the drum can be extruded. The dies thus are arranged around the axis with an inside face of the die facing toward the interior and located just outside the inner edge 45 of the disk 43. Each die thus forms a tube extending radially outwardly from the inner end at the edge 45 to an outer end extended beyond the outer edge of the disk.

The inner rotor 55 mounted within the outer housing 40 comprises a shaft 56 extending along the axis 47. The shaft 47 is mounted in end bearings with one bearing be located in an end cap 57 of the disk 46 and the second bearing being located in the end plate 53. Thus the shaft is carried on the axis 47 and can rotate around the axis 47 driven by a motor 58.

The inner rotor 55 carries a feed drum 59 which is located axially aligned with the inside surface of the casing 41 so that the feed drum acts to carry the feed material along the inside surface of the casing 41 to the circular opening 45 in the disk 43 so that the material can be presented through that opening to the dies.

The inner rotor 55 further includes a press wheel 60 carried on a support 61. The press wheel 60 is mounted with a wheel axis 63 offset from the shaft 56 and the axis 47. Thus the axis of the press wheel can be rotated around the axis 47 so that the wheel rolls around the inside surfaces of the dies moving from each die to the next as the shaft rotates. Support 61 is suitably designed to carry the press wheel to apply onto the inside surfaces of the dies a significant force providing compression of the material within the dies.

The drum 59 has an outer surface 63 which is located at a position spaced from the inside surface 42 of the outer casing 41. This defines therefore an annular chamber between these two surfaces. On the outside surface of the drum 59 is provided a flight 64 which extends diagonally along the outside surface 63 so as to form a helix defining an auger which rotates around the axis 47 and thus acts to carry material axially along the outside surface 63 of the drum toward the end 66 of the drum at the press wheel 60. It will be appreciated that the end 66 is located at the opening 45 in the disk 43 so that the action of the flight 64 is to carry the material into the area between the two disks and through the opening 45 to feed into the compression zone defined between the inside surfaces of the dies and the press wheel.

The dies 50 are held in place in an annular array surrounding the compression zone with each die extending radially outwardly from the axis 47. In practice the dies are formed in two halves so that each die piece has on each side one half of the tubular opening forming the die. Thus when the pieces are clamped together the two halves of the duct forming the die are closed.

Target moisture content for the materials supplied to the cubers is of the order of 17%. However for operation to occur, the moisture content can lie in the range 10% to 30%.

The materials selected for the container 23 are preferably arranged to provide a moisture content of the order of 6% to 15%.

While the preferred embodiments of the invention have been described above, it will be recognized and understood that various modifications may be made therein, and the appended claims are intended to cover all such modifications which may fall within the spirit and scope of the invention.

The invention claimed is:

1. A method of providing bedding for animals comprising;
   providing a crop material comprising one or more of wheat straw, barley straw, oat straw, timothy straw and various forage straws;
   compressing, heating and extruding using a cubing system a compressed mass of the crop material to form a body having a constant cross sectional shape along its length;
   breaking the body transversely at spaced positions along its length into pieces at least some of which form flakes;
   and placing the material on a floor surface inhabited by the animals for absorbing waste materials and for providing a floor covering on which the animals can lie.

2. The method according to claim 1 wherein at least some of the flakes have a transverse dimension matching that of the body.

3. The method according to claim 1 wherein the straw is shredded to less than 6 inch length.

4. The method according to claim 1 wherein the straw is cubed using a square die.

5. The method according to claim 1 wherein the straw is shredded so as to contain at least some pieces which are greater than 1.0 inch length.

6. The method according to claim 1 wherein the cubed straw is 10-40% more absorbent than dry wood shaving or sawdust with a 6% Moisture Content.

7. The method according to claim 1 wherein the moisture content is below 15%.

8. The method according to claim 1 wherein any seed in the straw flakes is made sterile by the heat generated in the compression during which the process destroys the germ of any seed.

9. The method according to claim 1 wherein the straw flakes have a bulk density of 12-35 lbs/cu ft.

10. The method according to claim 1 wherein dust particles in the shredded straw are compacted together during the compaction thus minimizing dust in the flakes.

11. The method according to claim 1 wherein the material is extruded through an orifice having a transverse dimension in the range from 0.25 to-2.25 inches.

12. The method according to claim 1 wherein the particle length of the final product is equal to or below the longest cross section dimension of the die.

13. The method according to claim 1 wherein the straw is blended with shredded paper and/or cardboard.

14. The method according to claim 1 wherein the straw is blended with wood shavings and/or sawdust for added fragrance.

15. The method according to claim 1 wherein salt compounds are added to the mixture to aid in de-icing in cold climates and make handling easier.

16. The method according to claim 1 wherein the flakes are less than 0.5 inch in thickness.

17. The method according to claim 1 wherein the compressed straw in the cubes and flakes is soft and has a "fluffy" texture making the bedding comfortable for the animals.

18. The method according to claim 1 wherein the flakes once broken apart by the animal have the appearance of freshly shredded straw.

19. The method according to claim 1 including using the flakes to capture ammonia to provide odor control.

20. The method according to claim 1 including using the flakes to absorb liquids.

21. The method according to claim 1 including adding hydrated lime to stabilize the product and inhibit against molds.

22. The method according to claim 1 wherein the cubing process exerts extreme pressure and friction on the straw particles causing the internal cell walls of the straw to collapse and expel any moisture locked within.

23. The method according to claim 1 wherein the rough surface of the press wheel and the action applied on the straw causes the straw pieces to split length-wise in effect refining the straw while compressing the material through the die.

24. The method according to claim 1 wherein the flaked straw is exposed to temperature above 110° F. for a minimum of 3 seconds so as to become pasteurized.

25. The method according to claim 1 wherein the shredded straw is compacted with a minimal force of 1000 PSIG.

26. The method according to claim 1 wherein the shredded product has moisture content of 30% or lower.

27. The method according to claim 1 wherein cubes formed in the cubing process are broken up into smaller pieces forming the flakes and fines by allowing the cubes to free fall and hit a deflection plate.

28. The method according to claim 1 wherein the flakes are easily broken down by the absorption of liquids and animal movement on the product.

29. The method according to claim 1 wherein the flat flakes are arranged to lay flat and create a matting effect.

* * * * *